R. S. KLING.
CALIPER GAGE FOR METAL MEASURING SCALES.
APPLICATION FILED MAY 14, 1920.
1,361,470.
Patented Dec. 7, 1920.
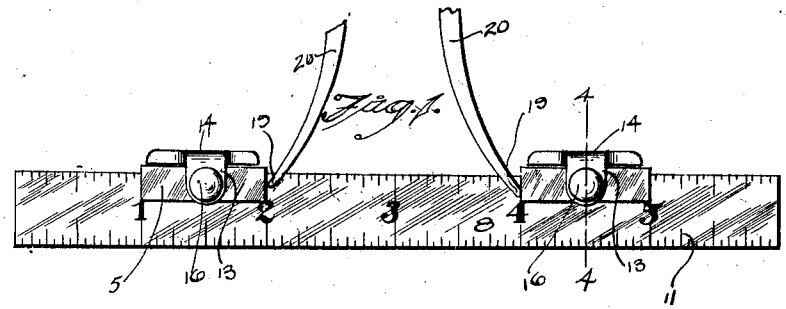
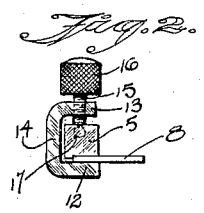
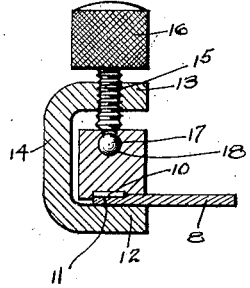
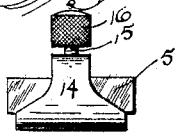
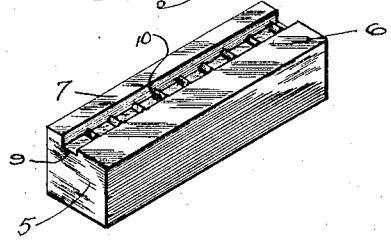
Inventor
Robert S. Kling
by Seymour H. Earle
Atty.

UNITED STATES PATENT OFFICE.

ROBERT S. KLING, OF WEST HAVEN, CONNECTICUT.

CALIPER-GAGE FOR METAL MEASURING-SCALES.

1,361,470.     Specification of Letters Patent.     Patented Dec. 7, 1920.

Application filed May 14, 1920. Serial No. 381,265.

*To all whom it may concern:*

Be it known that I, ROBERT S. KLING, a citizen of the United States, residing at West Haven, in the county of New Haven and State of Connecticut, have invented a new and useful Improvement in Caliper-Gages for Metal Measuring-Scales; and I do hereby declare the following, when taken in connection with the accompanying drawings and the characters of reference marked thereon, to be a full, clear, and exact description of the same, and which said drawings constitute part of this application, and represent, in—

Figure 1. a plan view of my improved caliper gage as applied to a metal measuring-scale.

Fig. 2. an end view thereof.

Fig. 3. a detached view of one of the caliper gages in rear elevation.

Fig. 4. an enlarged view in transverse section on the line 4—4 of Fig. 1, showing a tooth of the gage-block entered into one of the graduations of the scale.

Fig. 5. an enlarged detached reverse perspective view of one of the gage-blocks.

My invention relates to an improved caliper gage for use in conjunction with an ordinary metal measuring-scale, the object being to provide simple, convenient, and durable means for setting calipers with a far higher degree of accuracy than by direct application to the scale itself.

With these ends in view, my invention consists in a caliper gage having certain details of construction and combinations of parts as will be hereinafter described and pointed out in the claims.

In the practice of my invention, I employ two of my improved caliper gages, but inasmuch as they are exact counterparts of each other, a description of one will suffice for both. Each gage comprises an oblong gage-block 5 substantially square in cross-section, the lower face of the block being formed with a relatively wide, shallow, longitudinal rabbet 6 producing along its rear edge a positioning-shoulder 7, the forward edge of which will be brought to a bearing throughout its length upon one edge or the other of an ordinary metal measuring-scale 8 to which the gages are applied.

Directly in front of the positioning-shoulder 7, I form, in the lower face of the gage-block, a longitudinal groove 9 in which are located at regularly spaced intervals, transversely arranged locking-teeth 10, wedge-shaped in cross-section and sharp enough to enter the engraved graduation-markings 11 cut into the face of the scale 8, whereby the block is positioned and held upon the scale in strict accordance with the graduations thereon. Of course it makes no difference whether the scale is graduated on the standard American system or upon the metric system.

The said gage-block 5 is located between the wide base 12 and the overhanging arm 13 of a one-piece frame 14, the upper face of the base 12 forming a bearing for the edge of the scale, as clearly shown in Fig. 4. The arm 13 of the frame mounts a vertically arranged clamping-screw 15 having a knurled head 16 and formed at its lower end with a ball 17 entering a socket 18 in the center of the upper face of the gage-block 5, the edges of the socket-hole being peened over the ball 17, whereby the block is secured to the clamping-screw with slight freedom of rocking movement thereupon. As thus assembled, the block 5, frame 14, and clamping-screw 15 form a unitary structure designed to be handled as one piece.

In using my improved caliper gages, as shown in Fig. 1, two of them are set upon the metal measuring-scale 8 exactly two inches apart, let us say. The blocks 5 having been positioned upon the scale in accordance with the graduations thereupon, the clamping-screws are used to force the blocks downward whereupon their transverse locking-ribs 10 enter certain graduation marks upon the scale, whereby the blocks are positioned not only with the perfect accuracy of the scale, but locked against being accidentally displaced. The calipers to be set now have the outwardly turned gaging-points 19 of their legs 20 registered with the inner ends of the blocks, as shown in Fig. 1, the legs being spread apart until the points 19 are in full contact with the said ends of the blocks. The caliper is thus set to the exact measurement required and with a far higher degree of accuracy than can be obtained by applying the points of the caliper directly to the scale itself. Or, the caliper points 19 may be engaged directly with the outer ends of the blocks 5, it being merely a question of the character of use, whether the inner ends or the outer ends of the blocks are utilized.

I claim:

1. A caliper gage for use in conjunction with metal measuring-scales, the said gage having a frame, a clamping-screw mounted therein, and a gage-block having an upper and a lower face, located within the frame, connected with the said clamping-screw and formed upon its lower face with means for directly co-acting with the graduations on the scale when the same is introduced between the block and the base of the said frame, whereby the gage is accurately positioned upon the scale and held thereon against displacement.

2. A caliper gage for use in conjunction with metal measuring-scales, the said gage having a frame, a clamping-screw mounted therein, and a gage-block having an upper and a lower face, located within the said frame, co-acting with the said clamping-screw and formed upon its lower face with transversely arranged, spaced locking-teeth adapted to enter the graduations of a metal scale interposed between the block and the frame, whereby the gage is accurately positioned upon the scale and held thereon against displacement.

3. A caliper gage for use in conjunction with metal measuring-scales, the said gage having a frame, a clamping-screw mounted therein, and a gage-block having an upper and a lower face, located within the frame in position to be acted upon by the said clamping-screw and formed upon its lower face with a longitudinal rabbet adapting it to fit over a metal measuring-scale, with a positioning-shoulder for co-action with the edge of the scale, and with locking means adapted to enter the graduations of the scale for positioning the gage upon the scale with respect to the graduations thereof.

4. A caliper gage for use in conjunction with metal measuring-scales, the said gage having a frame, a clamping-screw mounted therein, and a gage-block having an upper and a lower face, located within the frame in position to be acted upon by the said screw and formed upon its lower face with a longitudinal rabbet, with a positioning-shoulder and with a groove containing a plurality of regularly spaced transversely arranged locking-teeth adapted to enter the graduations of the metal measuring-scale, whereby the gage is accurately positioned thereupon in accordance with the graduations thereof.

5. A caliper gage for use in conjunction with metal measuring-scales, the said gage having a frame comprising a base and an overhanging arm, a clamping-screw mounted in the said arm of the frame, and a gage-block having an upper and a lower face, located within the frame for co-action with the base thereof in clamping a scale, and formed upon its lower face with locking means for engagement with the graduations of the scale, whereby the gage is accurately positioned thereupon and held against displacement.

In testimony whereof I have signed this specification in the presence of two subscribing witnesses.

ROBERT S. KLING.

Witnesses:
H. H. KAVILLE,
GEORGE W. CHARMAN.